(12) United States Patent
Roach et al.

(10) Patent No.: US 6,314,100 B1
(45) Date of Patent: *Nov. 6, 2001

(54) METHOD OF VALIDATION AND HOST BUFFER ALLOCATION FOR UNMAPPED FIBRE CHANNEL FRAMES

(75) Inventors: Bradley Roach; Stuart Berman, both of Newport Beach; David Duckman, Long Beach, all of CA (US)

(73) Assignee: Emulex Corporation, Costa Mesa, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,930

(22) Filed: Mar. 26, 1998

(51) Int. Cl.[7] ............................. H04L 12/56; H04J 3/24
(52) U.S. Cl. .................... 370/394; 370/412; 370/474; 709/214; 712/1
(58) Field of Search .................... 370/394, 474, 370/471, 473, 276, 455, 412, 399, 351, 248, 403, 463, 216, 389; 395/200.63; 375/372; 709/222, 228, 214, 412; 711/162; 710/107; 712/1

(56) References Cited

U.S. PATENT DOCUMENTS

| | | | |
|---|---|---|---|
| 5,260,933 | * 11/1993 | Rouse | 370/216 |
| 5,495,580 | 2/1996 | Osman | 364/242.94 |
| 5,522,047 | 5/1996 | Grow et al. | 395/200.81 |
| 5,590,122 | * 12/1996 | Sandorfi et al. | 370/394 |
| 5,592,472 | 1/1997 | Grant et al. | 370/351 |
| 5,598,541 | * 1/1997 | Malladi | 710/106 |
| 5,603,064 | * 2/1997 | Bennett | 370/471 |
| 5,638,512 | 6/1997 | Osman et al. | 709/251 |
| 5,659,718 | 8/1997 | Osman et al. | 710/129 |
| 5,768,530 | * 6/1998 | Sandorfi | 395/200.63 |

(List continued on next page.)

OTHER PUBLICATIONS

Fiber Channel Tutorial, http:/www.fibrechannel.com/technology/tutorial.htm.
Fiber Channel Overview, http://www.cern.ch/HSI/fcs/spec/overview.htm.
Fiber Channel Glossary, http://www.iol.unh.edu/training/fc/fcglossary.html.

Primary Examiner—Hassan Kizou
Assistant Examiner—John Pezzlo
(74) Attorney, Agent, or Firm—Fish & Richardson PC

(57) ABSTRACT

A method of validation and host buffer allocation for unmapped fiber channel frames. More particularly, the invention encompasses a method of validating unmapped frames, each including a header and a payload, including receiving a frame as a current frame; determining if the current frame is a first frame in a sequence, and if so, saving the header and payload of the current frame in a buffer, and otherwise determining if the current frame is a next expected frame in the sequence; if the current frame is the next expected frame in the sequence, then saving the payload of the current frame in the buffer after the payload of the prior frame; determining if the current frame is a last frame in the sequence, and if so, sending a message to a host indicating receipt of the complete sequence; if the current frame is not the next expected frame in the sequence, then saving the header and payload of the current frame in the buffer, and sending a message to the host indicating receipt of a partial sequence. The host CPU is interrupted when either a complete sequence is received, or a partial sequence is received, followed by a frame from a different sequence. The host CPU may then process the concatenated payload of the sequence. The invention is particularly useful for processing TCP/IP frames in a Fiber Channel network.

13 Claims, 5 Drawing Sheets

U.S. PATENT DOCUMENTS

| | | | |
|---|---|---|---|
| 5,872,822 | 2/1999 | Bennett | 375/372 |
| 5,889,949 * | 3/1999 | Charles | 709/214 |
| 5,959,994 * | 9/1999 | Boggs et al. | 370/399 |
| 6,061,358 | 5/2000 | Nelson et al. | 370/412 |
| 6,105,122 * | 8/2000 | Muller et al. | 712/1 |
| 6,148,004 * | 11/2000 | Nelson et al. | 370/463 |

* cited by examiner

METHOD OF VALIDATION AND HOST BUFFER ALLOCATION FOR UNMAPPED FIBRE CHANNEL FRAMES

TECHNICAL FIELD

This invention relates to the transferring of data in computer networks, and more particularly to processing and transmitting sequences of non-interlocked frames of data across a computer network boundary.

BACKGROUND

The number of computers and peripherals has mushroomed in recent years. This has created a need for improved methods of interconnecting these devices. A wide variety of networking paradigms have been developed to enable different kinds of computers and peripheral components to communicate with each other.

There exists a bottleneck in the speed with which data can be exchanged along such networks. This is not surprising because increases in network architecture speeds have not kept pace with faster computer processing speeds. The processing power of computer chips has historically doubled about every 18 months, creating increasingly powerful machines and "bandwidth hungry" applications. It has been estimated that one megabit per second of input/output is generally required per "MIPS" (millions of instructions per second) of processing power. With CPUs now easily exceeding 200 MIPS, it is difficult for networks to keep up with these faster speeds.

Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, full motion, high-quality video.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", yield the highest performance by leveraging the benefits of cross-point switching.

The Fibre Channel fabric works something like a traditional phone system. The fabric can connect varied devices such as work stations, PCS, servers, routers, mainframes, and storage devices that have Fibre Channel interface ports. Each such device can have an origination port that "calls" the fabric by entering the address of a destination port in a header of a frame. The Fibre Channel specification defines the structure of this frame. (This frame structure raises data transfer issues that will be discussed below and addressed by the present invention). The Fibre Channel fabric does all the work of setting up the desired connection, hence the frame originator does not need to be concerned with complex routing algorithms. There are no complicated permanent virtual circuits (PVCs) to set up. Fibre Channel fabrics can handle more than 16 million addresses and thus, are capable of accommodating very large networks. The fabric can be enlarged by simply adding ports. The aggregate data rate of a fully configured Fibre Channel network can be in the tera-bit-per-second range.

Each of the three basic types of Fibre Channel connections are shown in FIG. 1, which shows a number of ways of using Fibre Channel technology. In particular, point-to-point connections 100 are shown connecting mainframes to each other. A Fibre Channel arbitrated loop 102 is shown connecting disk storage units. A Fibre Channel switch fabric 104 connects work stations 106, mainframes 108, servers 110, disk drives 112 and local area networks (LANs) 114. Such LANs include, for example, Ethernet, Token Ring and FDDI networks.

An ANSI specification (X3.230-1994) defines the Fibre Channel network. This specification distributes Fibre Channel functions among five layers. As shown in FIG. 2, the five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

While the Fibre Channel operates at a relatively high speed, it would be desirable to increase speeds further to meet the needs of faster processors. One way to do this would be to eliminate, or reduce, delays that occur at interface points. One such delay occurs during the transfer of a frame from the FC-1 layer to the FC-2 layer. At this interface, devices linked by a Fibre Channel data link receive Fibre Channel frames serially. A protocol engine receives these frames and processes them at the next layer, the FC-2 layer shown in FIG. 2. The functions of the protocol engine include validating each frame; queuing up direct memory access (DMA) operations to transfer each frame to the host; and building transmit frames. Each frame includes a header and a payload portion.

Conventional approaches to handling frames generally rely on the involvement of a host CPU on a frame-by-frame basis. For example, the validation of received frames and setting up DMA operations and acknowledgments typically involve the host CPU, which limits frame transmission and reception rates and prevents the host CPU from performing other tasks. Further, a host CPU with software protocol "stacks" may have difficulty keeping up with fast networks such as Fibre Channel.

Typically in Fibre Channel, all received frames are mapped to a context that allows a protocol engine to validate the received frame header against expected values. In particular, in most classes of Fibre Channel service, there is an interlocking frame that allows the transmitter and receiver to map a sequence of frames to an exchange using the "RXID" and "OXID" header fields. However, in certain classes of service and profiles (e.g., Class 3, TCP/IP), sequences of Fibre Channel frames are not interlocked. Thus, received frames have no associated context so the protocol engine cannot validate the header. In conventional designs, the protocol engine must pass both the received frame header and the payload to the host memory, so that the host CPU can validate the header and copy the payload data into the proper host buffer. Each transfer of a frame to the host memory generates an interrupt to the host CPU. This method burdens the host, consumes host buffer space for header storage, and wastes transfer bus bandwidth.

FIG. 3 shows a simplified block diagram of a typical prior art host data structure for unmapped frames. A first frame 300 and a second frame 302 are assembled from serial data received from a network data link. Each frame consists of a header and a payload portion, indicated in the diagram as "HDR 1" and "PL 1", and "HDR 2" and "PL 2", respectively. Since the received frames do not have an associated context, they cannot be validated by a protocol engine. Thus, both the received frame header and payload data of each frame 300 and 302 must be passed to the host memory 304 for header validation and proper buffer storage of the associated payload data. Frames stored in the host memory 304 are simply concatenated, as shown. The host must then serially examine each frame header to determine if the frame is part of the current sequence.

In view of the foregoing, objects of the invention include: increasing data transfer processing speeds in high speed networks such as the Fibre Channel network; providing a technique that can speed up a protocol engine's processing of data frames without involving the host CPU on a frame-by-frame basis; eliminate the need for the host CPU to copy the payload data in order to remove the intervening headers; reducing the number of host interrupts by only issuing a host interrupt when a complete or partial sequence of frames has been received; and eliminating wasted bus bandwidth and host memory required to store all frame headers for unmapped frames.

SUMMARY

The invention is directed to processing and transferring frames of data in a computer data link. The invention allows a protocol engine to perform header validation for unmapped frames under certain circumstances.

More particularly, the invention encompasses a method of validating unmapped frames, each including a header and a payload, including the steps of receiving a frame as a current frame; determining if the current frame is a first frame in a sequence, and if so, saving the header and payload of the current frame in a buffer, and otherwise determining if the current frame is a next expected frame in the sequence; if the current frame is the next expected frame in the sequence, then saving the payload of the current frame in the buffer after the payload of the prior frame; determining if the current frame is a last frame in the sequence, and if so, sending a message to a host indicating receipt of the complete sequence; if the current frame is not the next expected frame in the sequence, then saving the header and payload of the current frame in the buffer, and sending a message to the host indicating receipt of a partial sequence. The host CPU is interrupted when either a complete sequence is received, or a partial sequence is received when the current received frame is not consistent with the previous received frame (for example, if the sequence identification, source identifier, or sequence count of the current receive frame does not match the expected value). The host CPU may then process the concatenated payload of the sequence. The invention is particularly useful for processing TCP/IP frames in a Fibre Channel network.

The details of one or more embodiments of the invention are set forth in the accompanying drawings and the description below. Other features, objects, and advantages of the invention will be apparent from the description and drawings, and from the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

The invention improves host performance in high speed data links such as the Fibre Channel by reducing the number of interrupts to the host. The preferred embodiment of the invention saves "static" frame header fields for the first frame of a complete or partial sequence, calculates next expected values for "dynamic" frame header fields, and compares the "static" and "dynamic" header fields to corresponding fields in the next received frame. If the next flame matches the expected values, then the header of the next frame does not need to be written to host memory.

Figure 1:
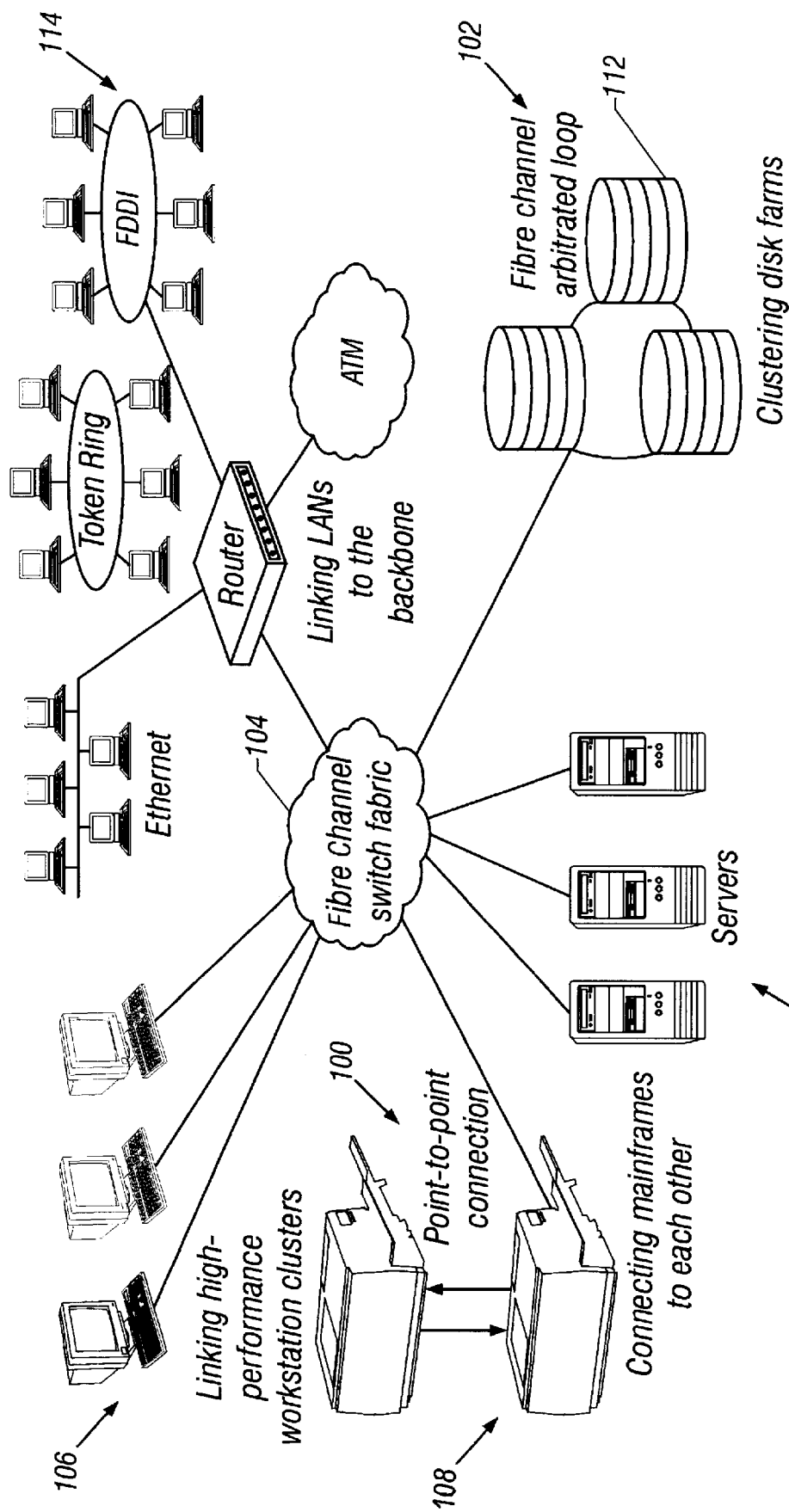
FIG. 1 is a block diagram of a prior art complex computer network utilizing Fibre Channel technology.
Figure 2:
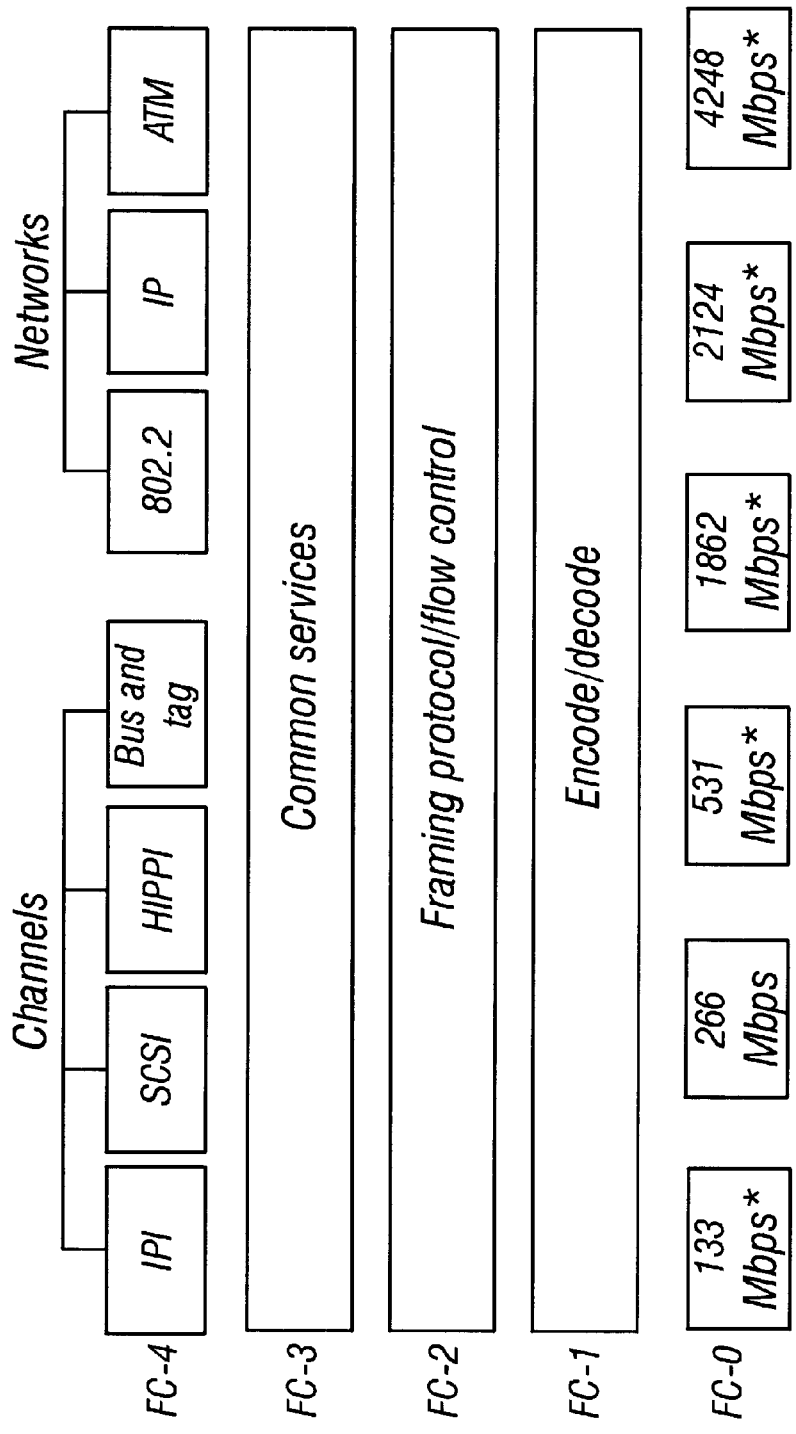
FIG. 2 is a diagram of the five functional layers of the prior art Fibre Channel standard.
Figure 3:
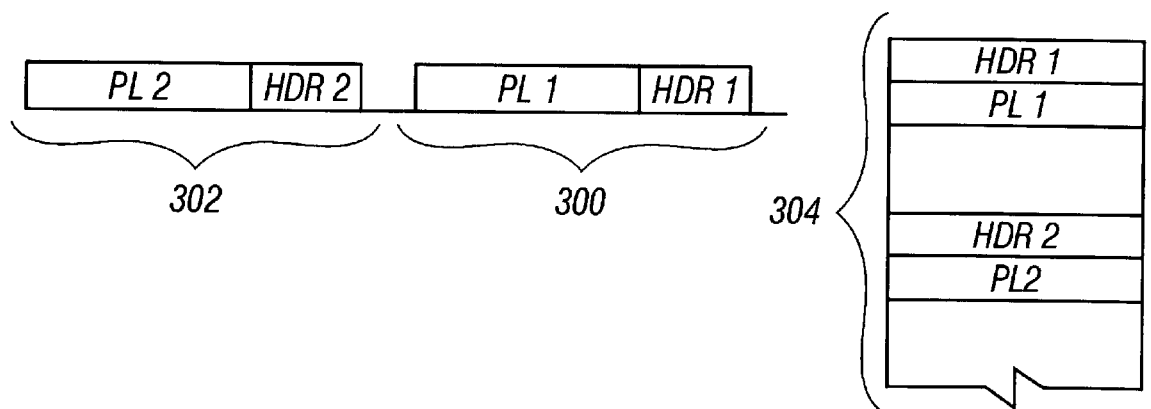
FIG. 3 is a simplified block diagram of a typical prior art host data structure for unmapped Fibre Channel frames.
Figure 4:
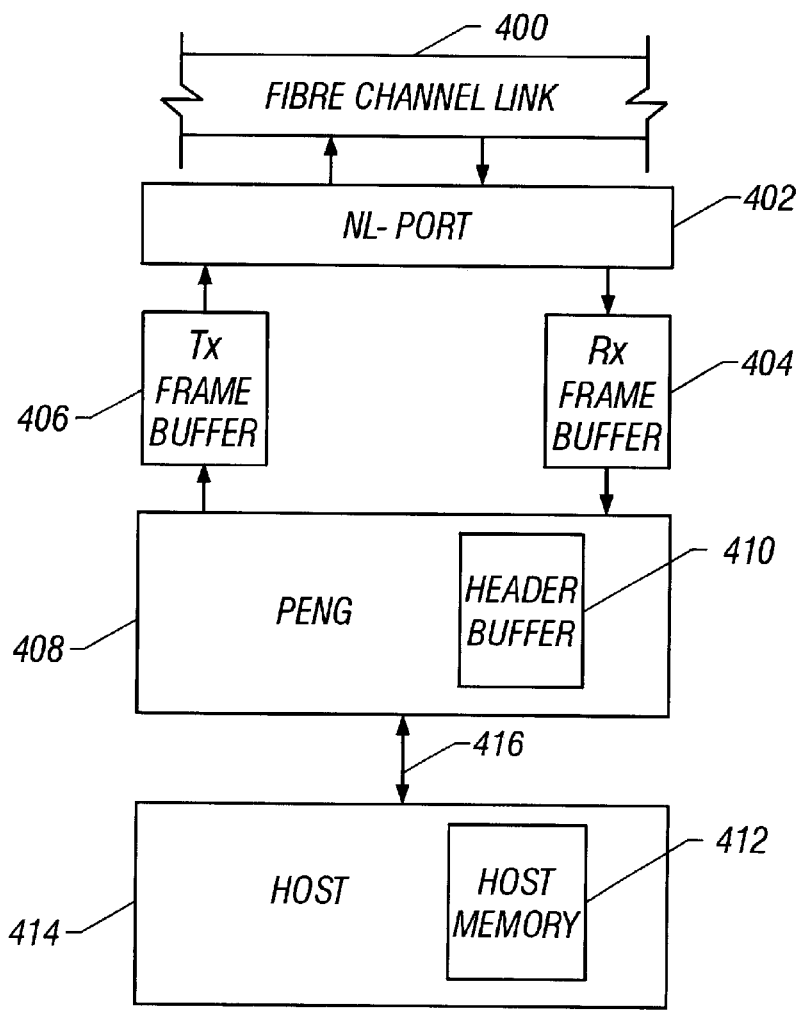
FIG. 4 is a simplified block diagram of a preferred communication processing system.

FIG. 4 shows a preferred communication processing system. Serial data is received along a Fibre Channel-like data link 400. Frames generally will include three portions: a preamble, a data or "payload" portion, and a trailer portion. In a Fibre Channel data link, for example, a frame includes a start of frame (SOF) word (four bytes); a data portion including a frame header (six bytes), between zero and 2112 payload bytes, and a cyclical redundancy check (CRC) word (4 bytes); and an end of frame (EOF) word (4 bytes). The frame header is used to control link applications, control device protocol transfers, and detect missing or out-of-order frames. The CRC word indicates whether there is a problem in the transmission, such as a data corruption, or whether some part of the flame was dropped during transmission.

Frames received from the data link 400 are processed by an NL-Port 402 which decodes and parallelizes the incoming serial data into words, and then assembles the words into frames. The NL-Port 402 also checks the CRC word for each frame received and adds a resulting "good-bad" CRC status indicator to other status information bits within an EOF status word that is generated from the EOF word. The NL-Port 402 then writes each frame into a receive frame first-in-first-out (FIFO) buffer 404. Further details of a preferred receive frame FIFO buffer module 404 are described in a co-pending patent application entitled "RECEIVE FRAME FIFO WITH END OF FRAME BYPASS", Ser. No. 08/935,898, filed on Sep. 23, 1997, and assigned to the same assignee of the present invention, the disclosure of which is incorporated by reference. In a similar fashion, the NL-Port 402 receives frames to be transmitted from a transmit frame FFO buffer 406 and converts such frames into serial data.

Frames are then received by a full-duplex communication processor, also referred to as a protocol engine (PENG), 408. Several functions are performed by the PENG 408, including: 1) queuing up a host command to write data in a received frame into host memory 412 through a direct memory access (DMA) channel; 2) validating the frame header to ensure that the frame is the next logical frame that should be received; 3) determining whether the frame is defective or not; and 4) generating transmit frames in response to a received frame or host-generated transmit command. Further details of a preferred PENG 408 are described in a co-pending patent application entitled "FULL-DUPLEX COMMUNICATION PROCESSOR", Ser. No. 08/937,066, filed on Sep. 24, 1997, and assigned to the same assignee of the present invention, the disclosure of which is incorporated by reference.

In accordance with the invention, the PENG 408 validates frame headers within a PENG header buffer 410 received from the receive frame FIFO buffer 404. The PENG 408 also builds transmit frames and sends them to the data link 400 through the transmit frame FIFO buffer 406.

A lookup-field inside each frame header includes a pointer to an associated "context". In general, the associated context is initialized by a host driver within the host memory 412, and contains information indicating where to put a particular frame of data in host memory 412. More particularly, the context contains fields such as maximum frame size, current buffer pointer and length, and state information, defined in a list of buffers. In a Fibre Channel implementation, the state information would include Small Computer Systems Interface (SCSI) state information.

When the look-up field is not provided in the frame header, the PENG 408 cannot get context information from the host, but it can accumulate temporary information about the current sequence of received frames. More particularly, in accordance with the invention, the PENG 408 works in conjunction with the host computer 414 to validate frame headers contained within the PENG header buffer 410. Each frame header tells the PENG 408 which context to access or "pull down" for that particular frame so that the frame can be validated. The context is pulled down from the host memory 412 under control of a context manager engine through a host memory interface 416. A receive protocol engine sequencer then validates the frame. Once frame validation is complete, the context pointed to by a frame header will tell the receive protocol engine what to do with the frame.

In accordance with the preferred embodiment of the invention, each frame includes data defining at least the following fields; a source ID, indicating the source of the frame; a sequence ID, indicating a particular sequence from the source; and a sequence indentifier, indicating the order of a frame within a particular sequence. The source ID may include a port ID and an exchange ID, which further qualify the source of numbered starting from zero, sequence #4 indicates that a frame examined by the PENG 408 in accordance with the invention to validate a sequence of frames.

Other information within a frame header may be used to validate a frame sequence. For example, Fibre Channel frames provide unique indicators for the SOF and EOF words of the first frame and last frame, respectively, in a sequence. These indicators can be used to further verify that a particular frame is in its expected sequence order, or that a break in sequence has occurred.

Figure 5:
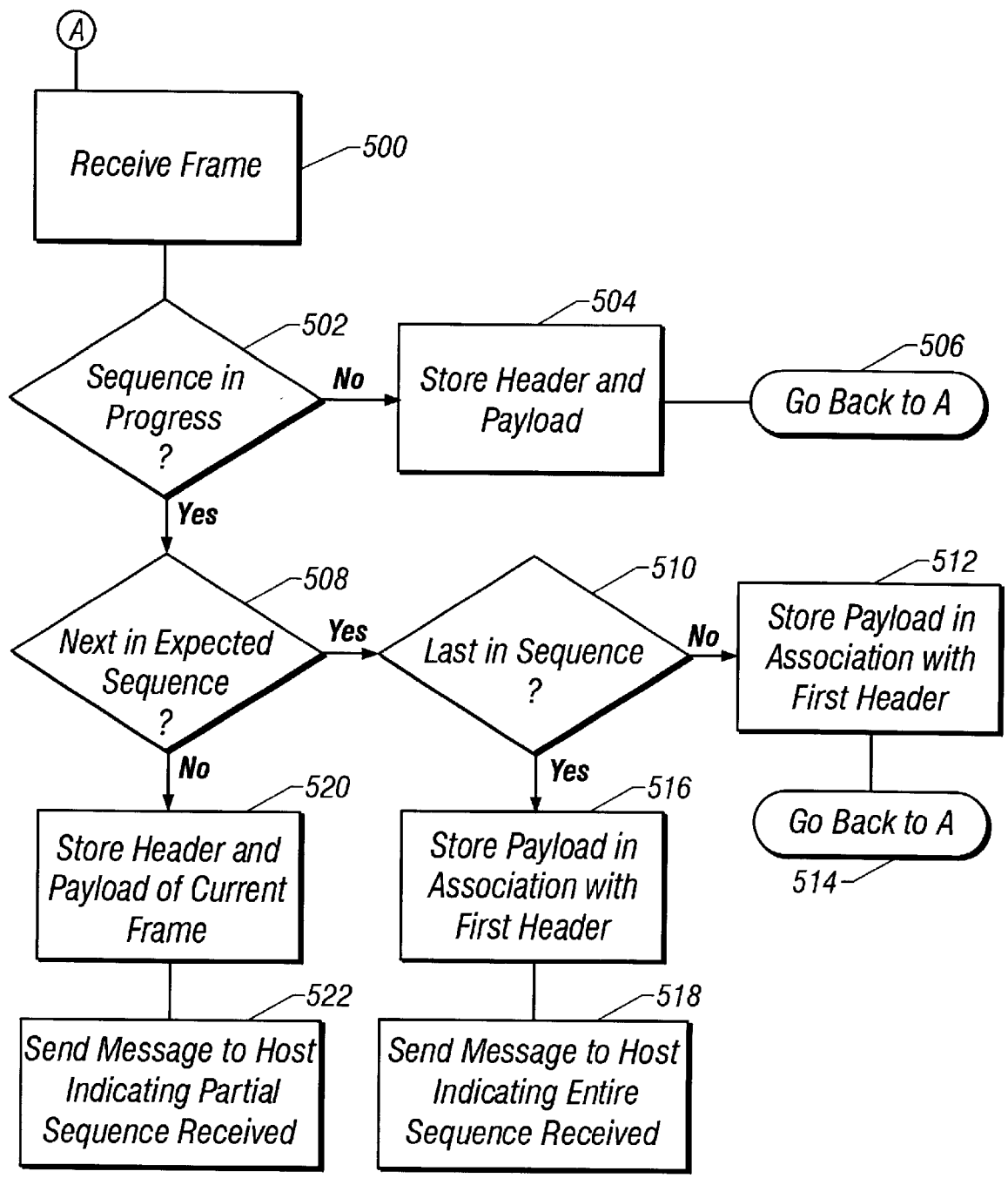
FIG. 5 is a simplified flow chart diagram of a header validation and host buffer allocation method in accordance with the invention.

FIG. 5 is a simplified flow chart diagram of a header validation and host buffer allocation method in accordance with the invention. In general, the header and payload of the first frame of a sequence is stored. Thereafter, each frame is received and compared to information derived from the previously received frame. If the current frame is the next logical frame in the same sequence, the header is not transferred and only the associated payload data is stored. This process continues until the next logical frame is not received or the sequence of frames ends.

More particular, starting at A in FIG. 5, a frame is received from the data link 400 (Step 500). If the received frame is not part of a sequence of frames in progress (Step 502), then the frame header and associated payload are stored in a buffer in the host memory (Step 504). The process then loops back to A to process a next frame (Step 506).

If a received frame is part of a sequence of frames in progress (Step 502), it is checked to see if it is the next expected frame in the sequence (Step 508). Verification of sequence order may be done, for example, by reading and storing the sequence identifier, sequence ID, and source ID of the previous frame in the PENG header buffer 410. The sequence ID and source ID of the next frame can then be compared for a match, and the sequence identifier checked for a consecutive value. This latter test may be performed in any of several ways, including: incrementing and storing the sequence identifier of the prior frame and comparing that stored value to the sequence identifier of the current frame for a match; storing the sequence identifier of the prior frame and subtracting that stored value from the sequence identifier of the current frame and testing for "1" as a result; storing the sequence identifier of the prior frame, decrementing the sequence identifier of the current frame, and comparing the stored value to the decremented sequence identifier of the current frame for a match.

If a received frame is the next expected frame in the sequence (Step 508), the frame is then checked to see whether it is the last frame in the sequence (Step 510). This may be determined, for example, by examining the frame header and determining the presence of a flag that indicates whether the current frame is the last frame of a sequence. If the received frame is not the last frame in the sequence, the frame header is discarded and the frame payload data is stored in the host memory (Step 512) in association with the prior payload in the same sequence. The process then loops back to A to process a next frame (Step 514).

On the other hand, if the received frame is the last frame in the expected sequence (Step 510), the frame payload data is stored in the host memory (Step 516). Thereafter, a message is sent to the host indicating that an entire sequence of frames has been received (Step 518). In the preferred embodiment, the message includes information from the frame header of the last frame, which may be used by the host for processing the entire sequence. The host may now process a single frame header and multiple, sequentially packed payloads, resulting in fewer host interrupts and higher throughput efficiency.

If, back in Step 508, it is determined that the received frame is not the next frame in the expected sequence, the header and associated payload data of the received frame are stored in the host memory (Step 520) to start a new sequence. A message is then sent to the host, indicating that the previous sequence is a partial sequence (Step 522). In the preferred embodiment, the message includes information from the frame header of the previous frame, which may be used by the host for processing the entire previous sequence. These last two steps, 520 and 522, may be reversed in sequence.

Figure 6:
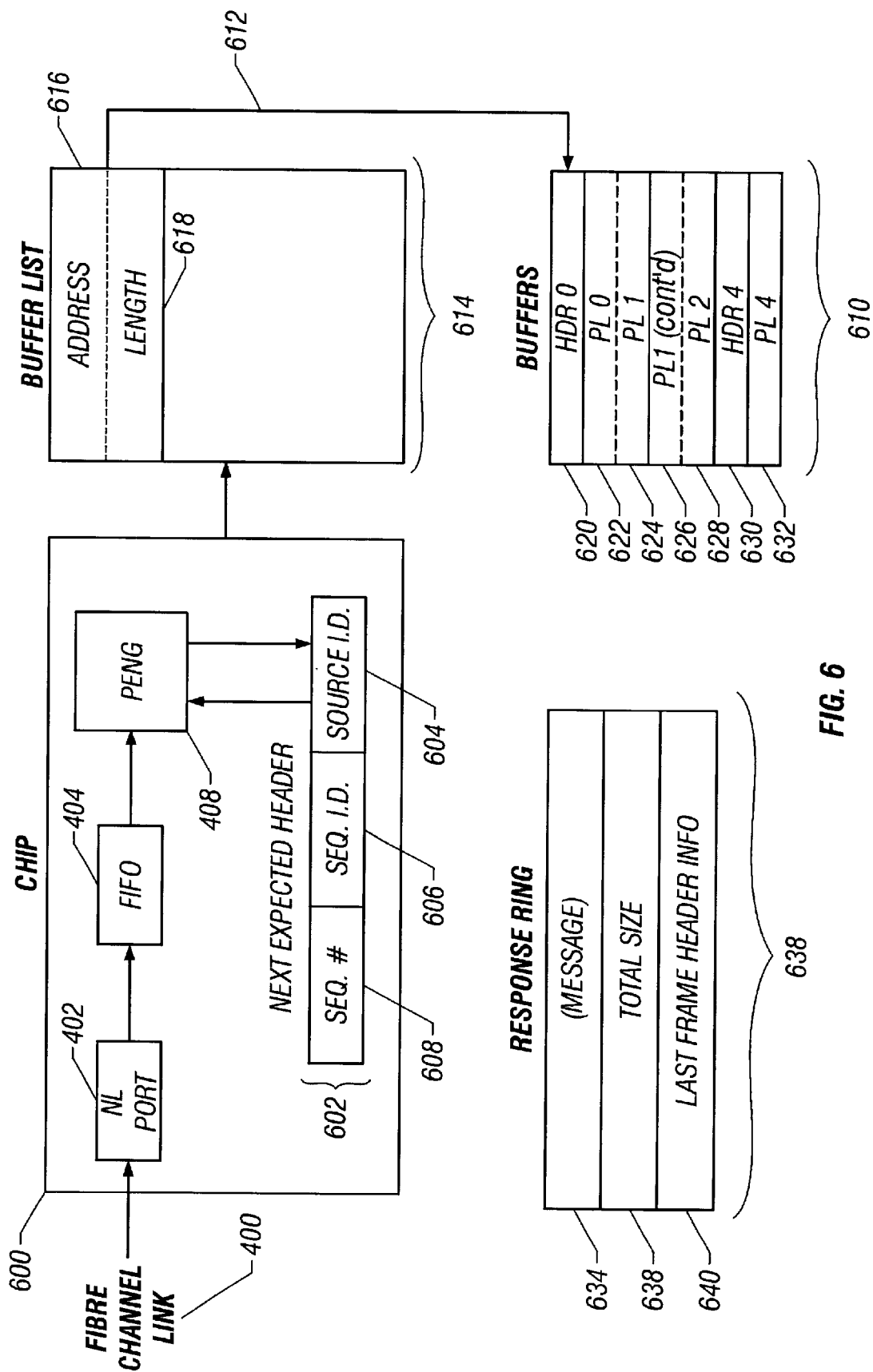
FIG. 6 is a block diagram of a communication processing system in accordance with a preferred embodiment of the invention, showing various preferred data structures after receipt of several incoming non-interlocking frames.

The consequence of the process outline in FIG. 5 is that the frame payloads of a sequence are logically concatenated in memory in association with a single header before host interaction is required. FIG. 6 is a block diagram of a communication processing system in accordance with a preferred embodiment of the invention, showing various preferred data structures after receipt of several incoming non-interlocking frames. In particular, serial data received from a Fibre Channel-like data link 400 are converted into frames by the NL-Port 402. The frames are transferred to the protocol engine (PENG) 408 through the receive frame FIFO buffer 404 and processed in accordance with the invention. The NL-Port 402, receive frame FIFO buffer 404, and PENG 408 can be implemented on a single chip 600, such as an application specific integrated circuit (ASIC). A register set 602 provides storage locations for storing a souce ID 604, sequence ID 606, and sequence identifier 608 for a processed frame, for comparison against similar fields in a current frame.

Initial frame headers and associated payload data sequences are placed into buffer slots 620–632 of a buffer 610. The buffer 610 is indexed by a buffer get pointer 612 associated with a buffer list 614 of sequential buffer descriptors. Each buffer descriptor includes an address 616 that points to the start of a buffer slot and a length 618 that indicates the size of a buffer slot entry.

In accordance with the invention, a header from the first frame in a sequence or the next frame of a different sequence is placed in the first available empty buffer slot 620 indicated by the buffer list get pointer 612. The get pointer 612 is then advanced to the next available empty buffer slot 622, which receives the payload from the first frame. When more frames are received for the same sequence in the proper order, their payloads are packed into the buffer 610 starting with the first payload buffer slot 622 (if space is available) and continuing into subsequent buffer slots.

For example, for an initial frame 0 having a header HDR0 and payload PL0, the header HDR0 is stored in the first available buffer slot 620 and the payload PL0 is stored in the next available buffer slot 622. Thereafter, a next frame 1 is received. The PENG 408 determines that frames 0 and 1 are part of the same sequence, and that frame 1 is the next expected frame after frame 0. Accordingly, the header for frame 1 is discarded and only the associated payload PL1 is stored in the buffer 610, using any available buffer space in buffer slot 622, then continuing as necessary into buffer slots 624 and 626. Thereafter, a next frame 2 is received. Frames 0, 1, and 2 are part of the same sequence and frame 2 is the next expected frame after frame 1. Again, the header for frame 2 is discarded and only the associated payload PL2 is stored in the buffer 610 in the next available buffer slot 628. This process continues until a new sequence commences (ie., a complete sequence has been received previously), or until a frame other than the next expected frame of the sequence is received ( ie., a partial sequence has been received). In either case, both the corresponding frame header and associated payload are placed into the next available buffer slots. For example, to illustrate receipt of a partial sequence of frames, assume frames 0, 1, 2, and 4 are part of the same sequence but frame 4 is not the next expected frame after frame 2. Rather, a frame 3, with corresponding header HDR3 and associated payload PL3 (not shown in the FIG. 6), is the next expected frame after frame 2. In this case, the frame 4 header HDR4 is stored in the next available buffer slot 630, the payload PL4 is stored in the subsequent buffer slot 632, and a message informs the host of the partial sequence(frames 0, 1, and 2).

A response ring 636 (ie., a memory register set or memory structure) is used for communicating information from the PENG 408 to the host. A message slot 634 is used to indicate receipt of a completed ("RSP_SEQ_RCVD") or partial ("RSP_PARTIAL_SEQ_ $_{RCVD}$") frame sequence. A size value 638 provides the host with the total size of the payload data for the sequence. In the preferred embodiment, the last frame header information 640 is also available for communication to the host. The host is then interrupted and processes the received sequence in any desired manner.

In summary, the invention decreases interruptions to the host, improves host driver performance, and eliminates wasting transfer bus bandwidth and host memory to store all unmapped frames by interrupting the host only when a partial or complete sequence of frames is received.

Implementation of other aspects of the invention follow readily from knowledge of the basic invention. The invention may be implemented in hardware or software, or a combination of both. If the invention is implemented in software, it may be configured as one or more computer programs executing on a processor comprising at least one processor element, a data storage system (including volatile and non-volatile memory and/or storage elements), at least one input port, and at least one output port. Program code is applied to input data to perform the functions described herein and generate output information. The output information is applied to one or more output ports or devices, in known fashion.

Each such computer program is preferably stored on a storage media or device (e.g., ROM or magnetic diskette) readable by a general or special purpose programmable processor, for configuring and operating the processor when the storage media or device is read by the processor to perform the procedures described herein. The inventive system may also be considered to be implemented as a computer-readable storage medium, configured with a computer program, where the storage medium so configured causes a computer or processor to operate in a specific and predefined manner to perform the functions described herein.

A number of embodiments of the present invention have been described. Nevertheless, it will be understood that various modifications may be made without departing from the spirit and scope of the invention. For example, a number of the steps and tests described above can be performed in different sequences and still obtain the same result. Thus, in an alternative embodiment to the embodiment shown in FIG. 5, the storage function of Steps 512 and 516 may be done before performing the last-in-sequence test of Step 510. Further, Steps 520 and 522 may be reversed. As another example, other criteria may be used to indicate that a sequence is incomplete; for instance, if a next expected frame is not received within a time-out period. Accordingly, other embodiments are within the scope of the following claims.

What is claimed is:

1. A method of validating unmapped frames, each including a header and a payload, including the steps of:
   (a) receiving an unmapped frame as a current unmapped frame;
   (b) determining if the current unmapped frame is part of a current unmapped sequence, and if not, saving the header and payload of the current unmapped frame in a buffer, and otherwise determining if the current unmapped frame is a next expected frame in the current unmapped sequence;

(c) if the current unmapped frame is the next expected frame in the current unmapped sequence, then saving the payload of the current unmapped frame in the buffer after the payload of the prior frame;

(d) determining if the current unmapped frame is a last frame in the current unmapped sequence, and if so, sending a message to a host indicating receipt of a complete current unmapped sequence;

(e) if the current unmapped frame is not the next expected frame in the current unmapped sequence, then sending a message to the host indicating reception of a partial sequence and saving the header and payload of the current unmapped frame in the buffer.

2. The method of claim 1, wherein each frame is a Fibre Channel frame.

3. The method of claim 1, wherein each frame header includes at least a sequence identification, sequence identifier, and source identification, and wherein the step of determining if the current frame is a next expected frame in the sequence includes comparing each sequence identification, sequence identifier, and source identification of the current frame to each corresponding sequence identification, sequence identifier, and source identification of a previous frame.

4. A system for validating unmapped frames, each including a header and a payload, including:

(a) an input port for receiving an unmapped frame as a current unmapped frame;

(b) a buffer configured to be coupled to a host processor;

(c) a protocol processor for:

(1) determining if the current unmapped frame is part of a current unmapped sequence, and if not, saving the header and payload of the current unmapped frame in the buffer, and otherwise determining if the current unmapped frame is a next expected frame in the current unmapped sequence;

(2) if the current unmapped frame is the next expected frame in the current unmapped sequence, then saving the payload of the current unmapped frame in the buffer after the payload of the prior frame;

(3) determining if the current unmapped frame is a last frame in the current unmapped sequence, and if so, sending a message to a host indicating receipt of a complete current unmapped sequence;

(4) if the current unmapped frame is not the next expected frame in the current unmapped sequence, then sending a message to the host indicating reception of a partial sequence and saving the header and payload of the current unmapped frame in the buffer.

5. The system of claim 4, wherein each frame is a Fibre Channel frame.

6. The system of claim 4, wherein each frame header includes at least a sequence identification, sequence identifier, and source identification, and wherein the protocol processor function of determining if the current frame is a next expected frame in the sequence includes comparing each sequence identification, sequence identifier, and source identification of the current frame to each corresponding sequence identification, sequence identifier, and source identification of a previous frame.

7. The method of claim 1, wherein step (c) further comprises discarding the header of the current unmapped frame.

8. The method of claim 1, wherein step (d) further comprises mapping the complete current unmapped sequence.

9. The method of claim 1, wherein the message indicating receipt of the complete current unmapped sequence includes information from a header of a last unmapped frame in the complete unmapped sequence.

10. The system of claim 4, wherein the protocol processor is further operative to discard the header of the current unmapped frame if the current unmapped frame is the next expected frame in the current unmapped sequence.

11. The system of claim 4, wherein the message indicating receipt of the complete current unmapped sequence includes information from a header of a last unmapped frame in the complete unmapped sequence.

12. The method of claim 1, wherein the buffer is in a host memory.

13. The system of claim 4, further comprising a host memory, wherein the buffer is in the host memory.

\* \* \* \* \*